United States Patent
Cherubini et al.

(10) Patent No.: US 8,976,482 B2
(45) Date of Patent: Mar. 10, 2015

(54) SERVO CONTROL

(71) Applicant: International Business Machines Corporation, Armonk, NY (US)

(72) Inventors: Giovanni Cherubini, Rueschlikon (CH); Jens Jelitto, Rueschlikon (CH); Mark A. Lantz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/898,839

(22) Filed: May 21, 2013

(65) Prior Publication Data
US 2013/0321949 A1     Dec. 5, 2013

(30) Foreign Application Priority Data

May 31, 2012   (GB) .................................. 1209690.5

(51) Int. Cl.
G11B 5/584   (2006.01)
G11B 5/55   (2006.01)
G11B 5/187   (2006.01)
G11B 5/29   (2006.01)
G11B 5/49   (2006.01)

(52) U.S. Cl.
CPC   *G11B 5/187* (2013.01); *G11B 5/29* (2013.01); *G11B 5/4976* (2013.01); *G11B 5/584* (2013.01)
USPC ..................... 360/77.12; 360/261.1

(58) Field of Classification Search
None
See application file for complete search history.

(56) References Cited

U.S. PATENT DOCUMENTS

| | | | |
|---|---|---|---|
| 5,291,348 A | 3/1994 | Copolillo | |
| 6,700,732 B1 * | 3/2004 | Indeck | 360/77.12 |
| 7,239,465 B1 | 7/2007 | Watson et al. | |
| 7,538,969 B2 | 5/2009 | Weber et al. | |
| 7,876,521 B2 | 1/2011 | Cherubini et al. | |
| 7,911,730 B2 * | 3/2011 | Hennecken | 360/77.12 |
| 2007/0076316 A1 | 4/2007 | Kuse et al. | |
| 2008/0158720 A1 | 7/2008 | Watson | |
| 2009/0268343 A1 | 10/2009 | Biskeborn et al. | |
| 2010/0067139 A1 | 3/2010 | Bates et al. | |
| 2011/0182157 A1 * | 7/2011 | Hoerger | 369/41.01 |

FOREIGN PATENT DOCUMENTS

| | | | |
|---|---|---|---|
| JP | 2003173508 A | 6/2003 | |
| JP | 2005166235 A | 6/2005 | |
| WO | 2004102538 A2 | 11/2004 | |

OTHER PUBLICATIONS

G. Cherubini, et al., "29.5-Gb/in2 Recording Areal Density on Barium Ferrite Tape," IEEE Transactions on Magnetics, vol. 47, No. 1, Jan. 2011, pp. 1-11.

(Continued)

*Primary Examiner* — Andrew L Sniezek
(74) *Attorney, Agent, or Firm* — Cantor Colburn LLP

(57) ABSTRACT

A tape head includes a set of one or more segments, wherein each segment of the set is individually movable with respect to a frame; each segment of the set comprising at least one of a write element configured to write data to a tape and a read element configured to read data from the tape; and each segment of the set comprising a further read element having a width transverse to a motion direction of the tape being at least a width of the write element of the segment or, in the event that no write element is comprised in the segment, of a write element of a different segment.

10 Claims, 8 Drawing Sheets

(56) References Cited

OTHER PUBLICATIONS

M. Lantz, et al., "Servo-Pattern Design and Track-Following Control for Nanometer Head Positioning on Flexible Tape Media," IEEE Transactions on Control Systems Technology, vol. 20, No. 2, Mar. 2012, pp. 1-13.

UK Intellectual Property Office; Application No. GB1209690.5; Patents Act 1977: Search Report Under Section 17(5); Mailed: Sep. 28, 2012; pp. 1-5.

* cited by examiner

US 8,976,482 B2

SERVO CONTROL

PRIORITY

This application claims priority to Great Britain Patent Application No. 1209690.5, filed May 31, 2012, and all the benefits accruing therefrom under 35 U.S.C. §119, the contents of which in its entirety are herein incorporated by reference.

BACKGROUND

The present invention relates to a tape head for reading and/or writing data from and/or to a tape when moving the tape across the tape head, a tape, and a method for operating a tape storage system.

Servomechanisms in tape drives include several components, which are mechanical parts, transducers, and signal-processing units that are realized by logical circuits. For example, in a track-follow servomechanism for state-of-the-art tape drives, a coarse actuator and a fine actuator may be used for the lateral positioning of a rigid tape head containing data write and read elements as well as servo read elements, also known as servo elements. In addition, a skew actuator might tilt the tape head to align the tape head module with the tape for write/read operations. One or multiple servo elements that are part of the tape head provide servo signals to respective servo channels for computing estimates of tape velocity and longitudinal tape position as well as a lateral tape head position, also known as transverse position, with respect to the tape, and a controller determines digital control signals for actuators such as an actuator for moving the tape head module as a whole in a lateral direction. With an increase in track density that is envisaged for future tape drives, controlling only the lateral position of a rigid tape head module and potentially its skew, whereby the distances between the servo elements and the individual read/write elements are fixed, might not be sufficient to ensure adequate individual positioning accuracy of the read elements relative to the individual data tracks.

Such positioning accuracy may be determined by a so-called read margin, which is defined as a minimum of the distances between a top or bottom edge of a read element and the top or bottom edge of a data track being read, respectively. If the read margin becomes negative, the read element may partly be positioned over an adjacent data track. Hence, the read element may start picking up signal contributions from the adjacent data track, which appear as an interference signal superimposed to a desired data signal, thus reducing a signal-to-noise ratio and consequently a reliability of the read process.

In state-of-the-art tape drives, environmental conditions may lead to tape expansion or tape contraction that may reduce the positioning accuracy and eventually limit the achievable track density. Furthermore, low-frequency processes such as tape tension fluctuations and residual dynamic tape skew of the tape head with respect to the tape also contribute to the reduction of positioning accuracy of the individual read elements.

SUMMARY

In one embodiment, a tape head includes a set of one or more segments, wherein each segment of the set is individually movable with respect to a frame; each segment of the set comprising at least one of a write element configured to write data to a tape and a read element configured to read data from the tape; and each segment of the set comprising a further read element having a width transverse to a motion direction of the tape being at least a width of the write element of the segment or, in the event that no write element is comprised in the segment, of a write element of a different segment.

In another embodiment, a tape storage system includes a tape head, including a set of one or more segments, wherein each segment of the set is individually movable with respect to a frame, each segment of the set comprising at least one of a write element configured to write data to a tape and a read element configured to read data from the tape, and each segment of the set comprising a further read element having a width transverse to a motion direction of the tape being at least a width of the write element of the segment or, in the event that no write element is comprised in the segment, of a write element of a different segment; and a controller configured to, for each segment, receive a signal read by the corresponding further read element, determine a frequency spectrum of the signal, and control an actuator for the segment so as to move the segment transverse to the motion direction of the tape subject to the determined frequency spectrum.

In another embodiment, a structure includes a tape configured to store data, the tape having a longitudinal and a transverse extension, the tape further comprising one or more data bands extending longitudinally along the tape and representing areas on the tape for storing data, each data band comprising multiple of data tracks extending longitudinally along the tape; two or more servo bands extending longitudinally along the tape and representing areas of the tape for storing servo information, each data band being arranged between two adjacent servo bands; at least one servo area arranged in one or more of the data bands which servo area extends longitudinally at a length less than the longitudinal extension of the tape, and extends transverse across multiple data tracks of the data band, wherein: each data track that contributes to a servo area contains a servo pattern within the servo area; each servo pattern comprises a repetition of a basic pattern with a frequency $f0*n$ and n being an integer; at least x adjacent data tracks contain a different servo pattern each, with $x>2$; and in each data band, multiple identical servo areas are arranged at defined longitudinal positions of the tape, each servo area spans the entire data band assigned, and n is a prime number.

BRIEF DESCRIPTION OF THE SEVERAL VIEWS OF THE DRAWINGS

The invention and its embodiments will be more fully appreciated by reference to the following detailed description of presently preferred but nonetheless illustrative embodiments in accordance with the present invention when taken in conjunction with the accompanying drawings.

DETAILED DESCRIPTION

Figure 1:
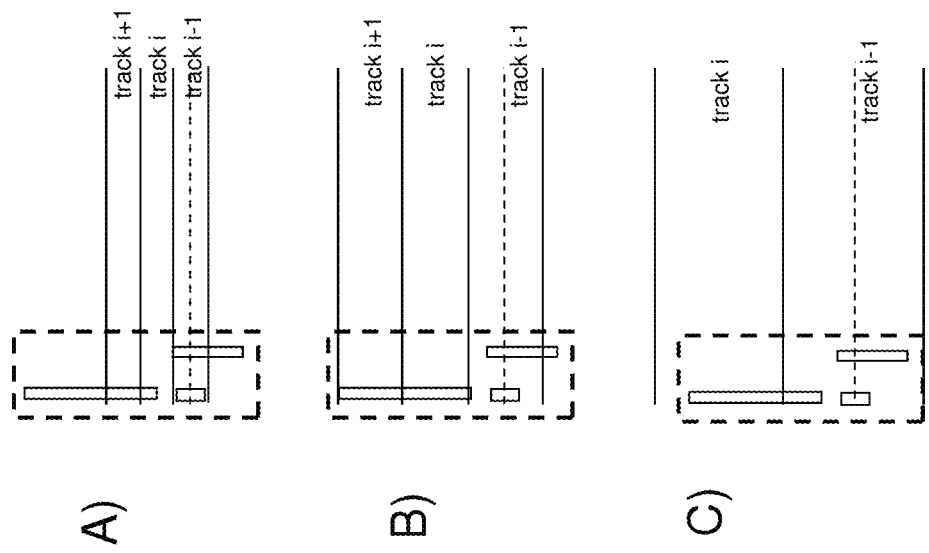
FIG. 1 illustrates a schematic top view of a segment of a tape head according to an embodiment of the present invention.

According to one aspect of the invention, a tape head is provided for reading and/or writing data from and/or to a tape when moving the tape across the tape head in a motion direction. The tape head comprises a set of one or more segments wherein each segment of the set is individually movable with respect to a frame of the tape head. Each segment of the set comprises at least one of a write element for writing data to the tape and a read element for reading data from the tape. Each segment of the set comprises a further read element whose width as a measure transverse to the motion direction of the tape is at least a width of the write element of the segment or, in case that no write element is comprised in the segment, of a write element of a different segment.

In embodiments, the tape head may comprise one or more of the following features: the set comprises at least two segments; the width of the further read element of each segment of the set is at least twice the width of the write element of the segment or, in case that no write element is comprised in the segment, of a write element of a different segment; the further read element of at least one of the segments of the set is adapted for reading servo patterns from a data band of the tape, the further read element of at least one of the segments of the set is offset in a direction transverse to the motion direction of the tape from at least one of the read element and the write element, the one or more segments of the set are movably mounted with respect to the frame of the tape head for taking different positions transverse to the motion direction of the tape; at least one of a write element for writing data to the tape and a read element for reading data from the tape is fixed to the frame of the tape head; in a segment of the set comprising the read element a width of the read element is at least half the width of the write element of the segment or, in case that no write element is comprised in the segment, of the write element of a different segment; at least one segment of the set comprises at least one of a set of read elements for reading data from different data tracks of the tape and a set of write elements for writing data to different data tracks on the tape, wherein the read elements and the write elements of the respective sets are mechanically linked Each segment of the set comprises a set of read elements for reading data from different data tracks of the tape and a set of write elements for writing data to different data tracks on the tape, and each segment comprises the single further read element for reading servo information from a data band of the tape; two columns of segments, and multiple rows of segments, wherein each row extends along the motion direction of the tape, and wherein each column extends transverse to the motion direction of the tape; a first class of segments in which first class of segments each segment contains one or more read elements and one further read element, and a second class of segments in which second class of segments each segment contains one or more write elements and one further read element; three columns of segments, and multiple rows of segments, wherein each row extends along the motion direction of the tape, wherein each column extends transverse to the motion direction of the tape, wherein two of the three columns contain segments of the first class only, wherein the third column contains segments of the second class only, and wherein the third column is arranged between the other two columns; three columns of segments, and multiple rows of segments, wherein each row extends along the motion direction of the tape, wherein each column extends transverse to the motion direction of the tape, wherein two of the three columns contains segments of the second class only, wherein the third column contains segments of the first class only, and wherein the third column is arranged between the other two columns;

According to another aspect of the present invention, a tape storage system is provided comprising a tape head according to any one of the preceding embodiments, and a controller, which controller for each segment is adapted to receive a signal read by the corresponding further read element, to determine a frequency spectrum of the signal, and to control an actuator for the segment for moving the segment transverse to the motion direction of the tape subject to the determined frequency spectrum.

In an embodiment, the tape storage may comprise the following feature: the controller is adapted to, for each segment, analyze the frequency spectrum and derive as a result of the analysis a transverse deviation of the segment from a desired position, and to move the segment back to the desired position by controlling the corresponding actuator.

According to a further aspect of the present invention, a tape is provided for storing data which tape has a longitudinal and a transverse extension. The tape comprises one or more data bands extending longitudinally along the tape and representing areas on the tape for storing data, each data band comprising multiple of data tracks extending longitudinally along the tape. Two or more servo bands extend longitudinally along the tape and represent areas of the tape for storing servo information, each data band being arranged between two adjacent servo bands. At least one servo area is arranged in one or more of the data bands which servo area extends longitudinally at a length less than the longitudinal extension of the tape, and extends transverse across multiple data tracks of the data band. Each data track that contributes to a servo area contains a servo pattern within the servo area. Each servo pattern comprises a repetition of a basic pattern with a frequency f0*n and n being an integer, and at least x adjacent data tracks contain a different servo pattern each, with x>2.

In an embodiment, the tape storage may comprise the following feature: in each data band multiple identical servo areas are arranged at defined longitudinal positions of the tape, wherein each servo area spans the entire data band assigned, and wherein n is a prime number.

According to another aspect of the present invention, a use of a tape storage system according to any one of the previous embodiments is provided for reading and/or writing data from and/or to a tape according to any of the previous embodiments.

According to a further aspect of the present invention, a method is provided for operating a tape storage system. A tape is moved in a tape drive in a motion direction across a tape head, the tape head comprising at least one write element, at least one read element and at least one further read element, wherein a width of the further read element as a measure transverse to the motion direction of the tape is at least a width of the at least one write element, and more specifically twice the width of the at least one write element. Servo patterns arranged in data tracks of the tape are read by one of the at least one further read element and a corresponding signal is provided. A lateral deviation of a segment of the tape head comprising the further read element is determined based on the signal, which segment is individually movable with respect to a frame of the tape head. A transverse position of the segment is controlled subject to the determined lateral deviation from a desired position.

In an embodiment, the method may comprise one or more of the following features: a frequency spectrum of the signal is determined and analyzed, and as a result of the analysis the lateral deviation is determined; the servo patterns are read from a tape according to any one of the previous embodiments.

According to another aspect of the present invention, a method is provided for writing servo patterns to a tape for reading and writing data from and/or to. The servo patterns are preformatted to the tape prior to the tape being used for reading or writing data from and/or to, and the preformatted tape is a tape according to any one of the previous embodiments.

According to another aspect of the present invention, a computer program product is provided comprising a computer readable medium having computer readable program code embodied therewith, the computer readable program code comprising computer readable program code configured to perform a method according to any one of the previous embodiments.

It is understood that method steps may be executed in a different order than listed in a method claim. Such different order shall also be included in the scope of such claim as is the order of steps as presently listed.

Embodiments described in relation to the aspect of an apparatus shall also be considered as embodiments disclosed in connection with any of the other categories such as the method, the computer program product, etc.

As an introduction to the following description, it is first pointed at a general aspect of the invention, concerning a tape head and a way for positioning a read and/or write element of the tape head of a tape storage system on a track centerline of a data track of a tape for improving read and write results respectively. The present idea includes a further read element in the tape head, which further read element is dimensioned in its width at least a width of the write element. The width of the further read element, as is a width of the write element, is a measure transverse to a motion direction of the tape, which tape is moved during operation across the tape head. Given that the tape itself has a longitudinal extension and a transverse or lateral extension orthogonal to its longitudinal extension, and which transverse extension defines the width of the tape, the width of the various elements of the tape head is a measure in parallel to a direction defined by the width of the tape.

Typically, a tape is organized into multiple data tracks in parallel to each other. The data tracks may all have the same width, i.e. the same extension in lateral dimension. A tape head may comprise multiple read and/or write elements wherein each read and/or write element during a read and/or write operation typically is assigned to one of the data tracks to read and/or write data from and/or to. When considering a read mode, for example, the multiple read elements may simultaneously read data from the respective assigned data tracks while the tape is moved across the tape head from reel to reel. Typically, the number of data tracks on the tape exceeds the number of read elements available at the tape head. Hence, at a given longitudinal position of the tape, for example, at the end of the tape, the tape drive may reverse its moving direction by reversing the direction the reel/s are driven, and the tape head including all the read elements being mechanically linked to each other may be laterally offset from the present position, by the width of at least one data track, so that all data tracks may be read by letting the tape head move across the tape in a serpentine fashion. In this context, a wrap is defined as a set of tracks written or read at the same time. The set of wraps that is written or read between two adjacent servo bands, while moving the tape across the head in such a serpentine fashion, determines what is usually referred to as a data band. Data bands typically span a region that extends over the entire length of the tape.

Although such read element being at least temporarily assigned to a data track, the lateral position of the read element may not exactly be centered on a track centerline of the assigned data track. Of course, the same holds for an assigned write element or an assembly of a read and a write element being linked mechanically. Any such deviation from a track centerline during reading and writing, i.e. any misalignment of a read and/or write element with respect to an assigned data track, may result in failing of reading the correct data, or may result in partially writing data to adjacent data tracks. Known tape storage systems provide means in the form of a servo mechanism for controlling a lateral position of the entire tape head. In such tape head the various read and write elements are mechanically coupled with each other with a fixed, non-alterable distance from each other. Still, individual read and/or write elements may deviate from their data track centerlines for various reasons, such as thermal expansion effects.

Hence, it was found that making one or more of a read and a write element individually movable—and movable with respect to the tape head, and in particular movable with respect to a frame of the tape head—may be beneficial in improving positioning individual elements or assemblies of elements. In the following, an entity of the tape head that is individually movable and in particular individually movable in a transverse direction is denoted as a segment of the tape head. For allowing an individual control of such segment, it is desired to provide a further read element in such segment of the tape head, and to include a servo area into a data band of the tape. In contrast, in conventional tape storage systems, a data band containing multiple data tracks may only hold or be reserved to hold user data, i.e. data being received from a host while servo information is exclusively written to dedicated servo bands at the edges of the data bands during tape manufacturing, which servo bands are read by means of dedicated servo readers exclusively installed for reading servo information from the dedicated servo bands.

According to an embodiment of the present invention, a servo area included in a data band may cover a short section of the data band in longitudinal direction, and may extend across multiple data tracks in transverse direction, and across all the data tracks of the subject data band in transverse direction. Such servo area further may repeat along the data band for multiple times. Between two servo areas in a data band, a section is provided for containing or being reserved to contain user data. Hence, user data sections alternate with servo areas in a data band of the tape. For example, a servo area may occur about every 2 meters in a data band of the tape. In this respect, the servo areas are not meant to claim a lot of storage space of a data band. And, each data band of the tape may contain such identical servo areas at the identical longitudinal positions along the tape. In other words, the data bands may be characterized by lateral stripes containing servo patterns.

Within such servo area, it is desirable that each data track contains a servo pattern. For example, each servo pattern of a servo area comprises a repetition of a basic pattern with a frequency $f0*n$ with n being an integer number. In an exemplary embodiment, n is a prime number. Hence, different data tracks within the servo area may contain different servo patterns, all of which servo patterns are built from a basic pattern with a frequency f0 being characterized by sections alternating in magnetic orientation. In the context of the tape being moved and read by the tape head, in the basic pattern the transitions between the sections of different magnetic orientation appear at the frequency 2*f0. In data tracks with servo pattern frequencies at n*f0 and n>1, these transitions appear n times more often than in the basic pattern with a frequency f0. In an exemplary embodiment, n>2 such that at least three different servo patterns—including the basic pattern when applied to a data track—are applied to the various data tracks covered by a servo area in a data band. In addition, at least x=n adjacent data tracks contain a different servo pattern each. In one embodiment, the n different servo patterns are repeated in transverse direction across the data band in the servo area.

The servo areas are embedded in the data bands at equally spaced intervals. The location where the servo areas are written onto the data track can accurately be determined, for example by referring to longitudinal position (LPOS) information embedded in the pre-written servo information in the servo bands.

According to the embodiment at the very beginning the width of the further read element is at least the width of the write element. Given that a write element typically at least has a width equal to the width of a data track on the tape, it can safely be assumed that the present further read element is designed and positioned for covering at least two data tracks during its motion along the tape. Hence the further read element will read at least from two data tracks simultaneously which in regular operation not necessarily is desired but is considered as an interference signal. However, in the present embodiment the further read element is considered as a read element for servo patterns of multiple data tracks simultaneously in servo areas, the servo patterns of at least two adjacent data tracks are simultaneously read by the further read element and provide a signal with a defined frequency pattern subject to the servo patterns written to these at least two data tracks being scanned. The frequencies contained in the signal of such further read element, which is also denoted as readback signal, may be determined and be analyzed as to their frequency and as to their magnitude per frequency. From the resulting frequency spectrum, which may be compared to a frequency sequence the servo patterns exhibit in lateral direction, it can be derived where in lateral dimension the further read element currently is positioned. Hence, it is on purpose that the further read element may read servo patterns from two or more adjacent data tracks and the readback signal of the further read element may be analyzed with respect to its frequency. The determined frequency spectrum may be translated into a lateral position of the further read element with respect to the tape. Such present lateral position may deviate from a desired lateral position, also denoted as reference lateral position, which may be a track centerline, such that such deviation may be supplied to a feedback controller for repositioning the further read element and all other read and/or write elements mechanically linked to the further read element to the desired lateral position.

Each segment of a set of segments may be defined as piece of the tape head that is individually movable and may comprise one further read element for implementing a servo control of the subject segment, and one or more of at least one read element and at least one write element. Whenever a segment contains only at least one read element and a further read element and no write element, the dimensioning of the width of the further read element may refer to a write element of another segment instead since it is assumed that the write elements of a tape head all show the same width.

The determined deviation of the segment from a desired position, which deviation is also denoted as position error signal, is used to derive a control signal for the individual actuator of that segment in order to maintain the read/write elements on the data track. Since there are at least two segments, at least two such closed-loop-control circuits are provided. An actuator for a segment may contain one or more of a piezoelectric actuator, a thermal actuator, or an actuator using electrostatic force to provide the required precise positioning capability to the segment. Note that another read and/or write element may be tied to the frame of the tape head such that this/these element/s are controlled by the standard fine actuator while the segments are additionally individually controlled by individual actuators.

The further read element may only read or may only perform readings while scanning a servo area. Hence, the further read element may start reading when a longitudinal position of the tape is reached indicating the beginning of a servo area in the moving direction of the tape. Such longitudinal position may be derived from some coding in the servo information of the servo bands, which may be identified by means of a servo reader element, for example. However, other mechanisms may trigger reading by the further read element. For example, a defined code/pattern in one or more of the data tracks may indicate the start of a servo area, or the beginning of the servo pattern itself may be identified by the further read element or a read element of the same segment. At the end of a servo pattern, reading by the further read element may be terminated, subject to a trigger similar to the trigger described above with respect to the beginning of the servo pattern.

In an exemplary embodiment, a deviation of the further read element, and consequently the segment from a desired position is determined during or after scanning the servo area. The subject segment is controlled to be set on the track centerlines with its read and/or write elements either during or after the complete servo area is scanned by the assigned further read element. In another embodiment, a small gap may be provided on the data band between the servo area and the subsequent user data section for allowing sufficient time for such determination and such positioning action.

It is noted that tape heads with various configurations of elements may be used for implementing the present idea. The amount and arrangement of elements into segments depends on the configuration of the tape head and the underlying tape specification.

In an exemplary embodiment, a segment may contain one further read element, one read element and one write element. In another embodiment, a segment may contain one further read element, multiple read elements and multiple write elements. In the latter embodiment, a group of neighboring read and/or write elements are combined and are mechanically linked into the segment, and only a single further read element is used to control the transverse position of the entire segment. In such embodiment, the complexity for further read elements is reduced at the cost of not every single read and write element being individually controllable in its transverse position. In each such segment configuration, it is implied that when the further read element detects a deviation from the track centerline, the additional elements of the same segment are deviated by the same magnitude due to the mechanical linkage. In such embodiment, only a single actuator may be provided for enabling a transverse movement of the entire segment.

Basically, there are two ways of writing the servo patterns of a servo area to the tape. In a first embodiment, the tape is preformatted, during tape manufacturing, with the servo pattern prior to the tape being used for reading or writing data from and/or to. In another variant of this embodiment, preexisting data fields in a data track may be used as servo patterns instead of dedicated servo patterns. Such data fields may include, for example, synchronization fields, in general, and Data Set Separator (DSS) fields and/or Variable-Frequency Oscillator (VFO) fields in particular. In another embodiment, the servo area is written to the tape by a write element of the tape head during tape drive operation. In such scenario, every time user data is written to a data track, a defined servo pattern is periodically written within the data track at dedicated longitudinal positions. The servo patterns are written by the write element that is also used for writing user data into user data sections. After a write element having written a servo pattern, it is continued to be used for writing user data. In such a scenario a single write element performs both operations writing the servo pattern and writing the user data in an alternating manner.

A tape head extending laterally across the entire width of the tape may include a frame holding the various read/write elements and further read elements arranged in individually movable segments. Each segment is transverse movably mounted in the frame of the tape head and may laterally move with respect to the tape head and its frame. The actuators and any suspensions if needed may be arranged or mounted at/to the tape head/frame.

In operation, and assuming that the data bands are straddled by preformatted servo bands and wraps are written in a serpentine manner as for example specified in the LTO (Linear Tape Open) standard, the first wrap in each tape motion direction may be a reference wrap, i.e. it would be written using only the servo information that is provided by pre-written servo pattern in the servo band, and possibly servo information pre-written over a short initial segment of tape. The following wraps would then be written by exploiting also the servo information contained in the previously written servo bursts of previously written wraps. The following wraps would then be written by exploiting also the servo information contained in the previously written servo areas. The location where the servo areas are to be written can accurately be determined for example by referring to the longitudinal position (LPOS) information embedded in the pre-written servo pattern, and aligning the servo bursts to the end of LPOS frames identified by the last bit in an LPOS word. To avoid the loss in efficiency that would be incurred by alternating write and read operations using write/read elements from the same tape head module, reading of the previously written servo bursts may be performed by using the reading elements on a parallel tape head module properly actuated in the off-track direction to guarantee that a useful servo signal is obtained while reading the servo area.

The present idea promotes the capability of individual lateral positioning of read and/or write elements in tape drives. It further promotes a new way for coding lateral position information into a data band of a tape. The present idea further promotes backward compatibility which describes the capability of a tape drive being able to write to and read from tape cartridges that are formatted for drives of previous generations. Typically, it is required that tape drives have means to write data on cartridges of the previous generation and to read data from cartridges of up to two generations back which may easily be implemented by the present idea.

In the figures, same or similar elements are denoted by the same reference signs.

FIG. 1 illustrates a schematic top view on a segment SG of a tape head. Such segment SG may comprise a plate, for example a substrate, on which in the present case a read element R for reading data from a tape is arranged as well as a write element W for writing data to a tape and a further reader FR for reading servo patterns from the tape. The segment SG is arranged such that a tape not shown passes the segment SG in a tape motion direction in x-direction or in reverse x-direction. Hence, the tape itself has a longitudinal extension in x direction and a transverse/lateral extension in y-direction, and y being orthogonal to x.

In the present example, the one read element R, one write element W and one further read element FR are comprised in the segment SG. Read and write elements R and W are arranged at least along a section of their lateral extension behind each other in x-direction. This assumes that the read and the write element R and W may be assigned to the same data track of the tape in operation. The read element R has a width RW in transverse direction of $\lambda w$ with $\lambda < 1$. w may in one embodiment refer to the width of a data track. The read element R may generally have a reader width RW smaller than the width of a data track w since the read element not necessarily needs to cover the entire width w of the data track for correctly reading the data from the data track. The write element W in the present example has a width WW of 2w. Typically, the write element W has a width WW of at least the width of a data track w in order to be in a position to magnetize the entire width of the data track w during writing data. The width WW may be even more than the width of the data track w in case of applying so called shingled writing. Here, the write element W is controlled to overwrite a previously written adjacent data track partially, such that the remaining width of the previously written adjacent data track constitutes the width of the data track. In contrast a width FRW of the further read element FR is dimensioned at least the width WW of the write element W. Consequently, the width FRW of the further read element FR is more than the width w of a data track. Even if the width FRW of the further element FR is equal to the width WW of the write element W, this width FRW may be more than the width w of a data track in case of shingled writing. In the present example of FIG. 1, the width FRW of the further read element is 4*w with w being the width of a data track. Hence, the further write element FR normally is not in a position of reading data from a single data track. Whenever the further read element FR presently would read from data tracks, the information from at least four data tracks would be read simultaneously in this example, which is not desired for reading data. However, in case of the proposed design of the servo patterns in the data tracks the signal of the further read element FR may be used for determining a current lateral position of the segment SG. As can be seen from FIG. 1, the further read element FR is laterally offset from the read element R and the write element W: The offset d1 versus the write element W in an exemplary embodiment is set to $w/2+/-\delta$. The offset d2 from the read element R is set to $(1-\lambda/2)*w+/-\delta$. Since the further read element FR is offset from both the write and the read element W and R, in general the further read element FR scans information from different tracks than the read element R and the write element W operate on.

Figure 2:
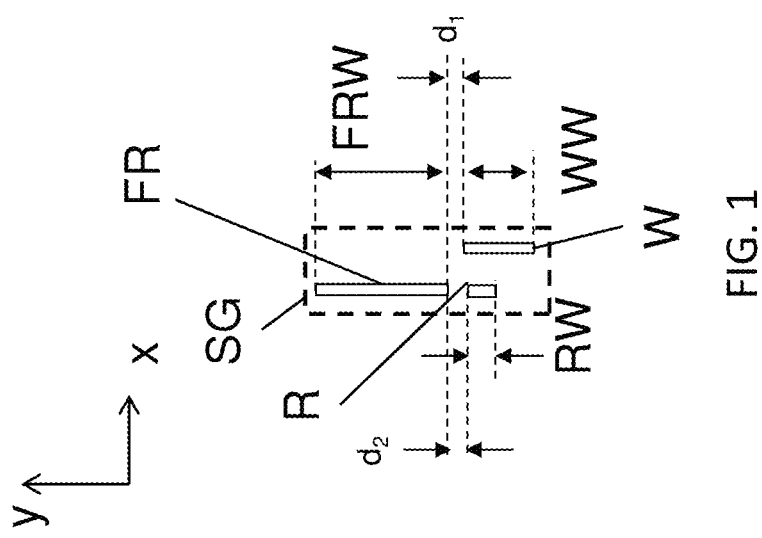
FIG. 2 illustrates a schematic top view of the segment of FIG. 1 in combination with a tape of three different generations.

FIG. 2 illustrates the segment SG of FIG. 1 in different scenarios A) to C). For a better illustration, reference signs referring to the segment and its elements are omitted. The segment SG is shown in operation while a tape with data tracks is passing the segment SG in the longitudinal direction x. In the scenario of FIG. 2A), the read and the write elements R and W are assigned to a common data track i−1 while the further read element FR scans at the same time data tracks i partially, data tracks i+1, i+2 and i+3 fully, and data track i+4 partially again. This scenario shall refer to a tape format of a present tape generation which may, for example, be a standardized tape format such as standardized under the LTO (Linear Tape Open) standard.

However, when designing new tape formats, on the one hand track density shall be increased, which requires read and write elements of smaller width being applied. On the other hand, by means of a tape drive of a new generation tapes or tape cartridges of previous generations shall still be operable. Such property is referred to as backward compatibility. For example, in the above LTO standard, a tape drive of a present generation shall be capable of writing and reading to/from tape cartridges that are formatted for drives of previous generations, and specifically, it may be required that a tape drive of the present generation may be capable of writing data on cartridges of the previous generation and be capable of reading data from cartridges of up to two generations. Such backward compatibility is inherent in a tape drive, and specifically in a segment of a tape drive that is designed according to an embodiment of the present invention. In FIG. 2B) a tape format of the previous generation with respect to the generation of FIG. 2A) is shown. Each data track may have approximately twice the width of a data track according to the present generation. The read element R is capable of reading from such data track extended in its width. So is the write element W since it is designed to presently have a width that corresponds to the width of the data track of the previous generation. And also the further read element FR now covers at least two data tracks in width for scanning servo patterns from. Hence, a full read and write backward compatibility is granted in view of the previous generation. A tape format of a second previous generation is shown in FIG. 2C) wherein again the width of each data track has doubled compared to FIG. 2B). Now, a full read compatibility is achieved since the read element R still is in a position to read data from a data track, and also the further read element is capable of reading servo information from at least one data track. However, the write element no longer is capable of writing data to such data track since its width is too small for covering the entire width of such data track.

In some embodiments, however, backward compatibility up to the previous generation only, i.e. backward compatibility up to one generation, is required. In this case the width FRW of the further read element FR is at least a width WW of the write element W.

Figure 3:
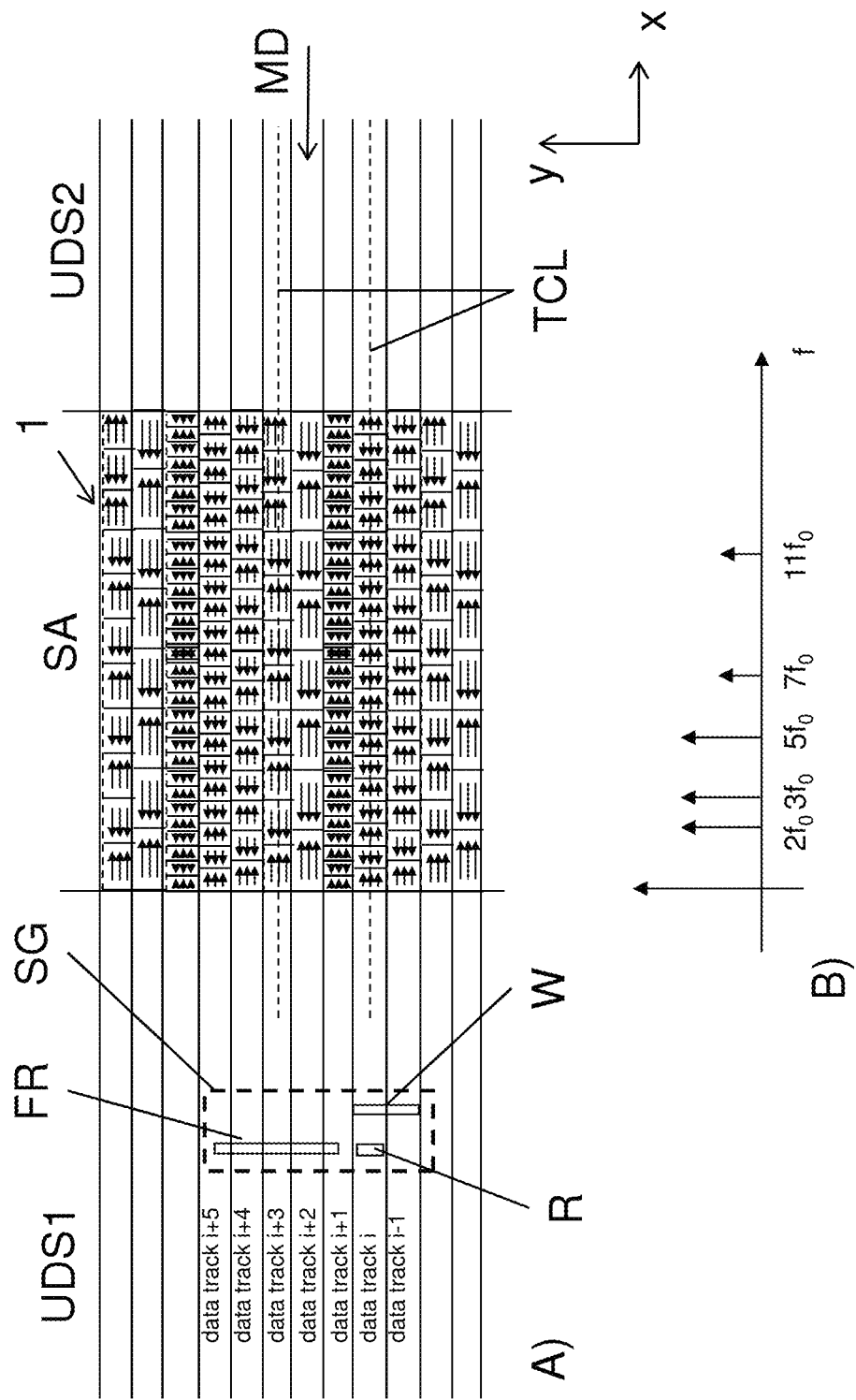
FIG. 3 illustrates, in two diagrams, a section of a tape in top view and an illustrative movement of a segment across the tape, according to an embodiment of the present invention, in diagram A), and a resulting signal in the frequency domain supplied by the further reader of the segment, according to an embodiment of the present invention in diagram B)

FIG. 3A) illustrates a section of a tape 1 in top view and an illustrative movement of a segment SG of a tape head across the tape 1, according to an embodiment of the present invention. The widths of the read element R, the write element W and the further read element FR of the segment shall accord to FIG. 1 or FIG. 2A). The tape 1 is meant to be moved across a tape head presently not shown in its entirety in moving direction MD. The section of the tape 1 as presently shown in FIG. 3 comprises multiple longitudinal data tracks . . . , i−1, i, i+1, i+2, . . . , in parallel to each other. Of course, the tape 1 is meant to comprise many more data tracks, which are not shown in FIG. 1. The shown data tracks are part of a data band comprising multiple adjacent data tracks which data tracks in conventional tape storage systems are exclusively reserved for storing data. However, in the present embodiment, the subject data band comprises two different sections, i.e. a user data sections UDS and a servo area SA alternating with the user data sections UDS. In FIG. 3, a first user data track section UDS1 is followed by a servo area SA and a second user data section UDS2. The servo area SA covers all data tracks of the present data band. The servo area SA is repeated along the length of the tape at given intervals. The other data bands of the tape comprise identical servo areas, arranged at the same longitudinal positions as the servo areas of the present data band.

In the present example, it is assumed that the each data track comprises a servo pattern in the servo area SA. In the present example, the servo patterns in the various data tracks all are periodic waveforms, whose frequencies are integer multiples of the frequency f0 of a basic pattern which shall have a period equal to twice the period of the pattern of data track i+2 in the present example. The servo area SA in the present example covers two periods of the basic pattern in longitudinal direction, wherein in a pattern one period is determined by two consecutive cells with different magnetic orientation, as is indicated by corresponding arrows in such cells in data tracks in FIG. 3A). When reading such a servo pattern, the transitions between the magnetic orientations are recognized in the readback signal such that at a given velocity of the tape the readback signal shows a given frequency in transitions, which is also referred to as frequency of the servo pattern, i.e. in the present case an integer multiple of the frequency f0 of the basic pattern. In the present example, the cells of the data track i+2 are magnetically encoded in the servo area SA such that a readback signal with a frequency 2*f0 may be the result at scanning the data track i+2 at constant velocity. Generally it is desired that within a servo area n different servo patterns are used, with the n different servo patterns being adjacent to each other and the set of the n servo patterns being repeated along the transverse extension of the data band.

In an exemplary embodiment, n adjacent data tracks are characterized by having frequencies n1*f0, n2*f0, . . . , nN*f0, that are multiples of the basic frequency f0. The factors n1, n2, . . . , nN multiplying f0 are prime numbers with respect to each other, so that harmonics of a servo pattern frequency do not coincide with frequencies of other servo patterns in adjacent data tracks. The sequence of frequencies periodically repeats across a data band. The number n may depend on a maximum track density increase expected for future tape drive generations, so that backward compatibility will be satisfied.

Hence, in the present embodiment, backward compatibility is achieved by properly choosing the dimensions of the further read element and its position in a head module relative to the read/write elements, so that a position-error signal (PES) for an individual data track is obtained by comparing relative amplitudes of spectral components in the signal of the further read element at the n frequencies corresponding to the patterns in the servo area. The amplitudes of the spectral components can be obtained by a Discrete Fourier Transform (DFT) algorithm. This is shown in FIG. 3B). According to FIG. 3A) the further read element FR scans a part of data track i+1, full data tracks i+2, i+3 and i+4, and again a part of data track i+5 and supplies a signal containing the individual signal component from the servo patterns of these data tracks. Then, the spectrum of the readback signal is determined, which is shown in FIG. 3B). The spectrum is analyzed and amplitudes of the spectral components are evaluated, and evaluated in that these are compared with each other. From this analysis on the spectrum, it can be determined which data tracks the further read element FR covers such that a lateral position of the further reader FR can be determined, in a coordinate system that is related to a lateral position of the tape head or its segment respectively. This immediately leads to a deviation of the measured lateral position compared to a desired lateral position, which reflects a position in which data reliably can be read and written with the read element R and the write element W.

Referring back to FIG. 3A), the segment may read and/or write data to the tape 1 during moving across the first user data section UDS1. Wherever the beginning of a servo area SA is identified, no more data are read/written at least when the segment SG starts covering the servo area SA. Since all the data tracks in the servo area SA contain servo patterns, during scanning the servo area SA only the further reader FR may be active in reading out the servo patterns of the various data tracks.

Figure 4:
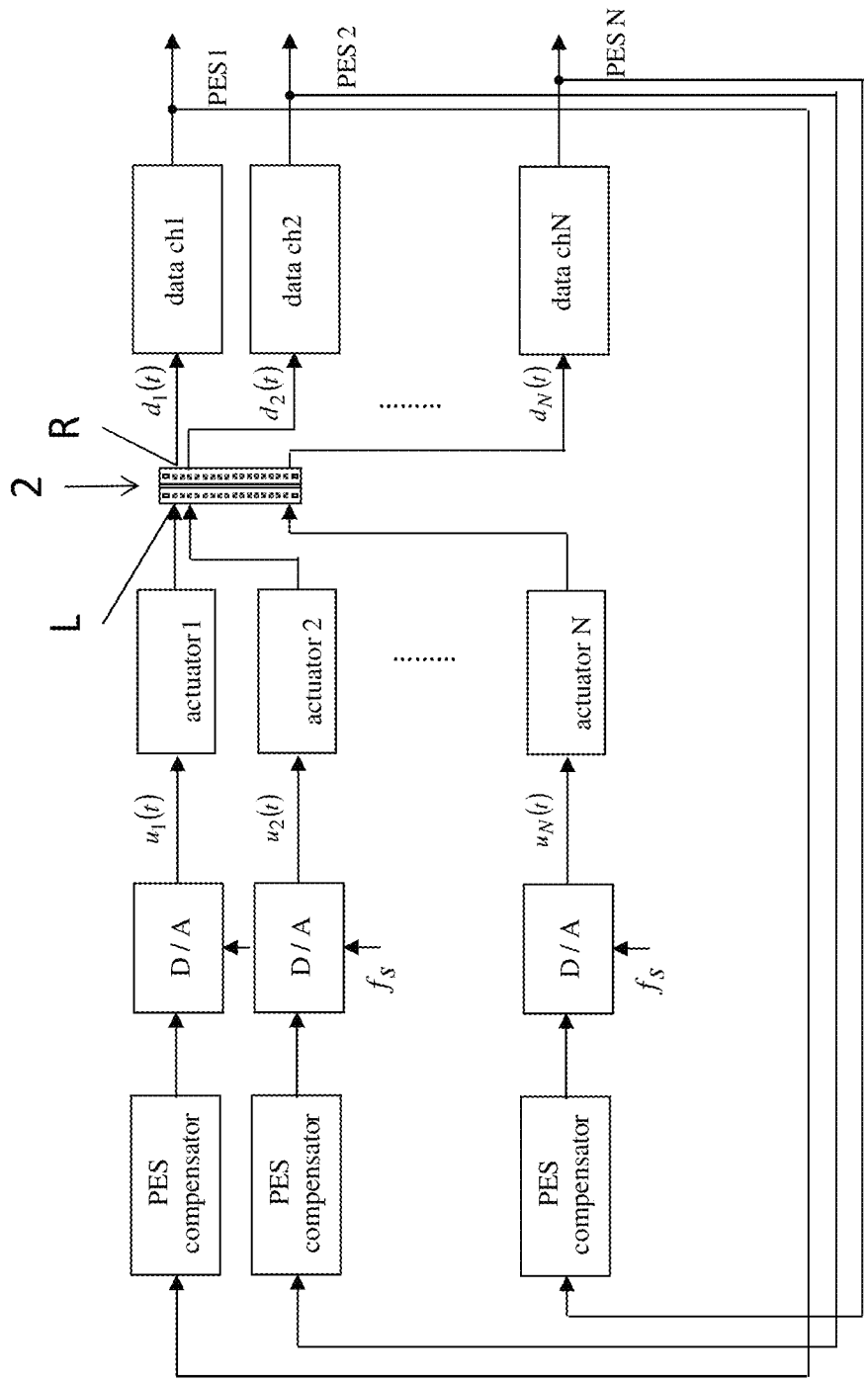
FIG. 4 is a block diagram illustrating a control circuit for all segments of a tape head according to an embodiment of the present invention.

FIG. 4 illustrates a block diagram of a control circuit for all segments in a tape storage system according to an embodiment of the present invention. A tape head 2 symbolically comprises two tape head modules L and R, each tape head module L and R comprising multiple read and write elements arranged in various segments, and presently in N segments. Note that only the actuators for positioning the segments within one head module are explicitly shown for illustration purposes. Further read elements of each segment at least of one head module L or R scan a servo area of the tape and supply signals $d1(t)$, $d2(t)$, .... Following building blocks labeled "data ch1", "data ch2", ..., analyze the supplied signals $d1(t)$, $d2(t)$, ..., and, for each signal $d1(t)$, $d2(t)$, ..., derive a current transverse position of the associated segment. Such information is supplied in form of a Position Error Signal (PES) to building blocks labeled "PES compensator", in which compensation signals may be determined for realigning up to N segments from their current positions. Such control signals are converted by the following digital/analog D/A converters into analog control signals $u1(t)$, $u2(t)$, ..., which control signals $u1(t)$, $u2(t)$, ..., are supplied to the actuators of the various segments being deviated from the desired position. Such closed-loop control is applied for each segment of a set of segments.

Figure 5:
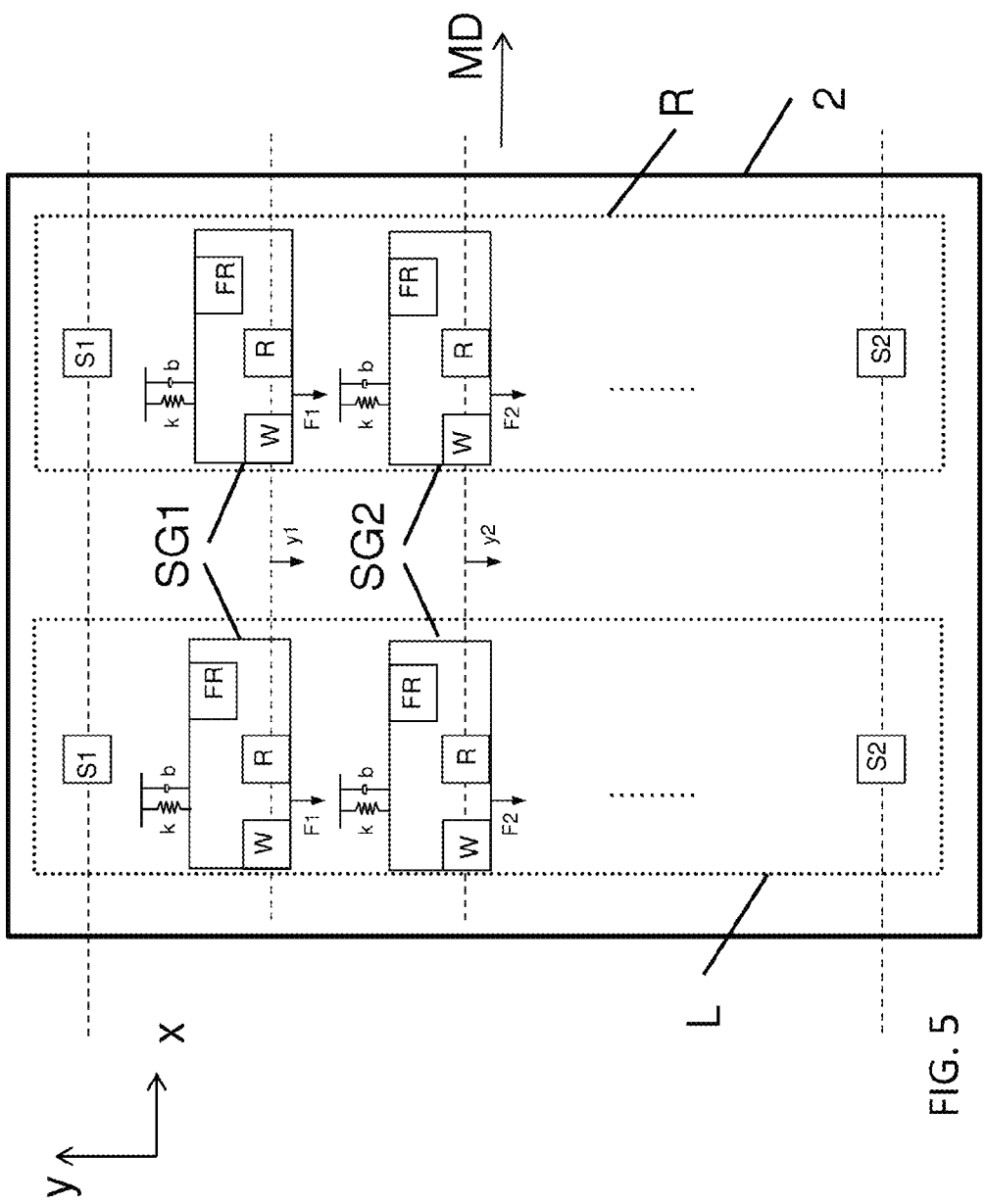
FIG. 5-FIG. 8 are schematic top views on various tape heads according to embodiments of the present invention.

FIG. 5 illustrates a tape head 2 of a tape drive system according to an embodiment of the present invention. The tape head 2 is illustrated in top view and a tape, which is not shown, shall be moved across the tape head 2 in moving direction MD. At its upper and lower end, the tape head 2 comprises servo elements S1 and S2 which are fixed to the tape head 2 and allow for reading servo information preformatted on the servo bands on the tape 1 which extend all along the length of the tape. The dashed lines in this area denote lateral reference positions of the servo bands. Between the servo bands, data bands are arranged on the tape, and between adjacent data bands further servo bands may be arranged. In one example, five servo bands and four data bands are arranged on the tape in alternating manner with the bands at the edges of the tape being servo bands. The servo bands typically are preformatted. Each data band may have multiple data tracks in parallel to each other and along the longitudinal extension of the tape.

The present tape head comprises two modules R and L. Each tape head module L, R may comprise an individual frame to which the various servo, read, write and further read elements are mounted. The tape head modules L, R may be individual tape head modules and may individually be replaceable, for example. Each tape head module L, R may comprise the same amount of segments SG with each segment SG comprising a single read element and a single write element. Therefore, the tape head 2 of FIG. 5 is configured to allow read-after-write operations, in which user data written to the tape 1 are immediately read by a read element R following the write element W in tape moving direction MD. This allows for an immediate verification of the data written to tape. In the present embodiment, for example, the write head W of the first segment SG1 of the left tape head module L may write user data to the tape 1 which user data immediately is read by the read element R of the first segment SG1 of the right tape head module R. Once the tape's moving direction MD reverses, the write element W of the first segment SG1 in the right tape head module R writes user data to the assigned data track and the read element R of the first segment SG1 of the left tape head module L immediately reads the written user data which written data is then verified in the controller of the tape drive with the user data received for writing to the tape 1.

Each module comprises multiple segments SG such as a first segment SG1, a second segment SG2, ... wherein it is assumed that the first segments SG1 are assigned to a first data track and the second segments SG2 are assigned to a second data track below the first data track and so on. Each segment SG comprises a write element W, a read element R, and a further read element FR. It is assumed that the write element W and the read element R are assigned the same data tracks a centerline of which data track is referred to by a dashed line. Note that the width of the read, write and further read elements R, W and FR in this and the following three figures are not scaled and do not represent their actual width, which is defined according to various embodiments of the present invention.

In addition, each segment SG is equipped with an actuator F (not shown) and a restoring force element k in form of a spring with a damping element b. The actuators F may for example be embodied as piezo actuators. Hence, each segment may be moved in transverse direction by the actuator F against the force of the restoration element k, wherein a resulting force F1 acts on the first segments SG1 and holds the first segments SG1 in a defined lateral position in transverse direction. Hence, the first segments SG1, the second segments SG2 and further segments are laterally movable with respect to the tape head 2.... Actuators F and restoring force elements k are arranged in/on the tape head 2.

From a different view, the segments of FIG. 5 are arranged in rows in direction x and in two columns in direction y.

Figure 6:
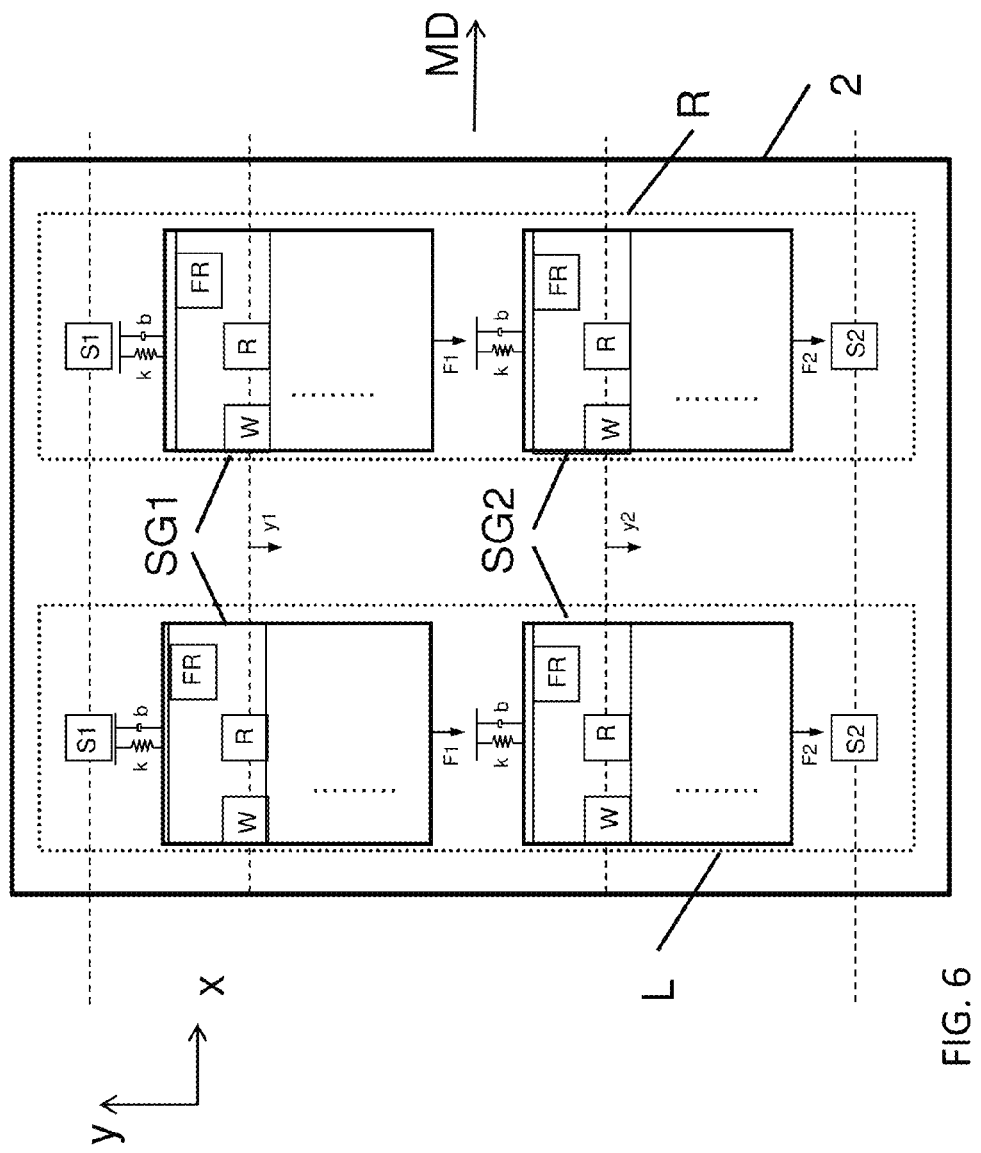

FIG. 6 illustrates another tape head 2 in top view crossed by a tape in moving direction MD. In comparison with the tape head 2 of FIG. 5 the segments SG of the tape head show a different configuration. Each segment SG now not only includes one read element R, one write element W and one further read element FR but an entire set of read elements R, an entire set of write elements W, while the single further read element FR is maintained. Hence, each segment SG now holds multiple read and write elements R, W assigned to multiple data tracks. These sets of read and write elements are mechanically coupled such that these elements only can be laterally moved together. The current position for the entire segment SG therefore is determined by means of the further read element FR. In such embodiment, a segment SG may be assigned to a fraction of a data band and be responsible for reading and writing data from and/or to the assigned fraction of the data band exclusively.

Again, the segments are arranged in multiple rows in direction x and in two columns in direction y.

Figure 7:
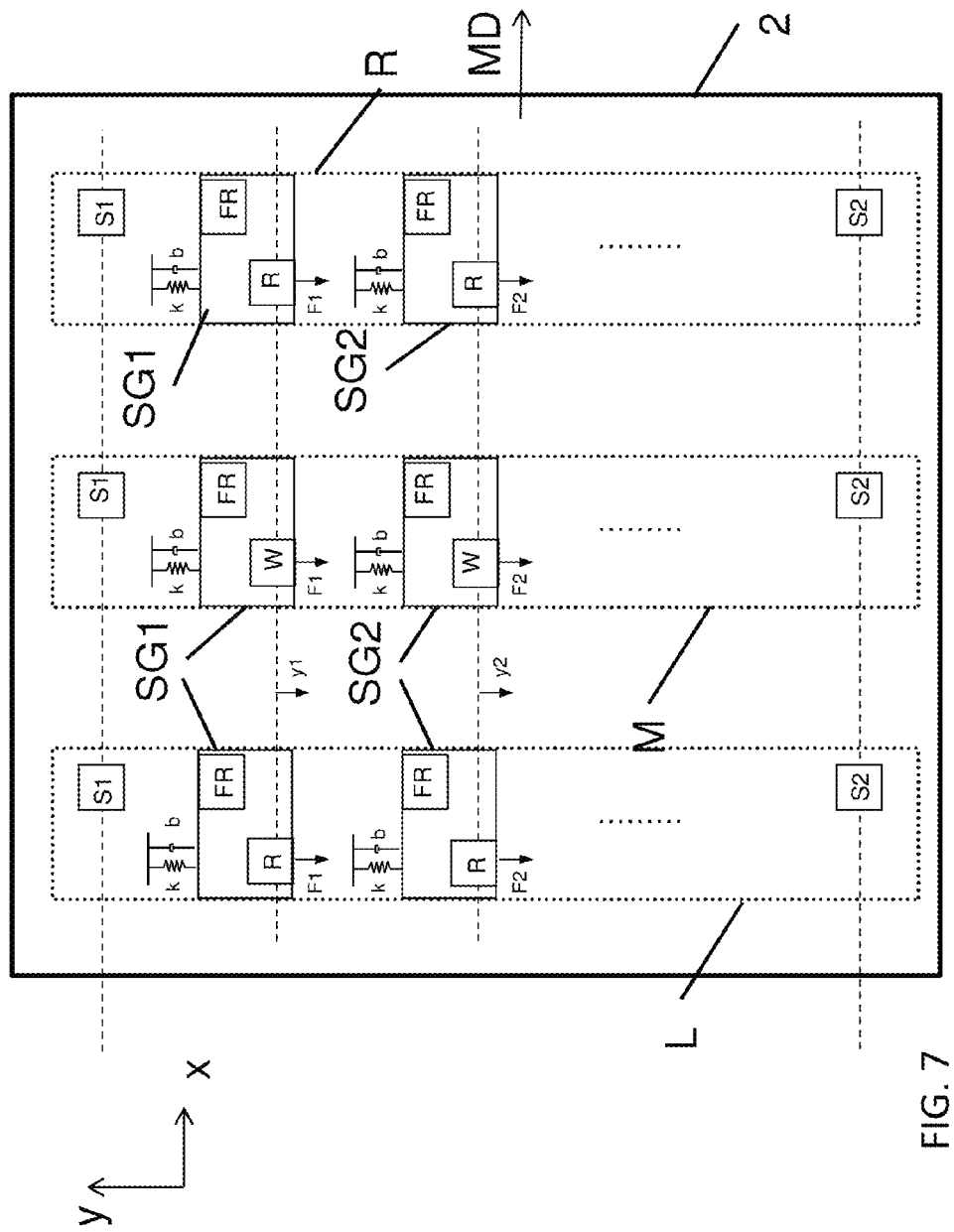

FIG. 7 illustrates another tape head 2 in top view crossed by a tape 1. The tape head of FIG. 7 comprises a left tape head module L, a center tape head module M and a right hand tape head module R. While segments SG of the left tape head module L exclusively comprise read elements R and corresponding further read elements FR, the center tape head module M exclusively comprises write elements W and further read elements FR, and the right hand tape head module R only comprises read elements R and further read elements FR. Each of the segments SG of all modules is individually movable and controllable in its transverse position, i.e. each of the read and write elements R, W are individually movable and controllable in their transverse position, and therefore is individually mounted to and interconnected with the associated tape head module by means of a suitable actuator. The actuators and spring elements are no longer referred to by reference signs for illustration purposes.

This embodiment comprises multiple rows of segments in direction x and in three columns in direction y.

Figure 8:
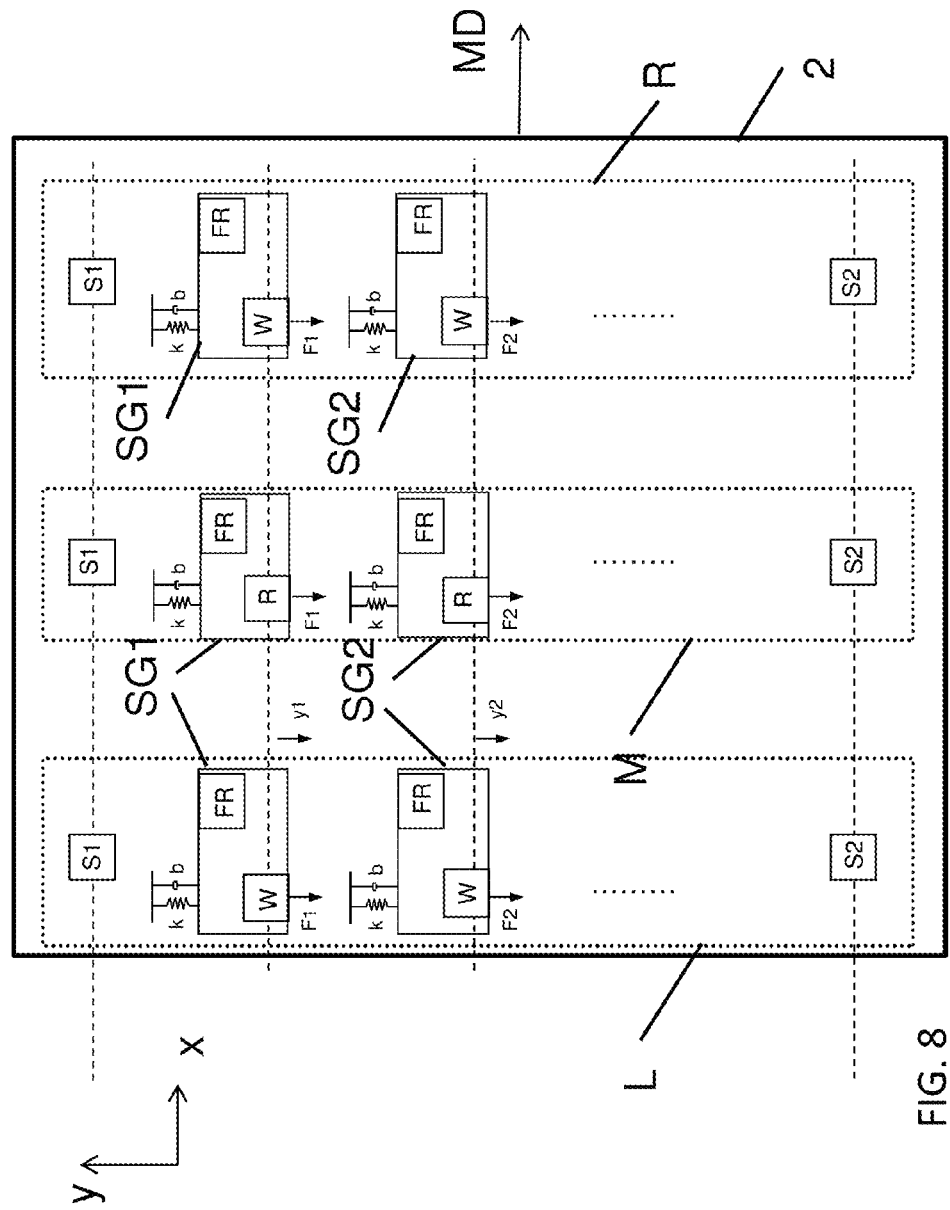

FIG. 8 illustrates another tape head 2 in top view to be crossed by a tape in moving direction MD. The tape head 2 of FIG. 8 again comprises a left tape head module L, a center tape head module M, and a right hand tape head module R. However, now the segments of the left tape head module L exclusively comprise write elements W and further read elements FR, the segments of the center tape head module M exclusively comprise read elements R and further read elements FR, and the segments of the right hand tape head module R only comprise write elements FR and further elements FR. Each segment SG and as such each of the read and write elements of all modules is individually movable and controllable in its transverse position, and therefore is individually mounted to and interconnected with the associated tape head module by means of a suitable actuator.

This embodiment comprises again multiple rows of segments in direction x and in three columns in direction y.

When implementing a read-after-write mode with the present tape head configuration, and assuming a moving direction MD as indicated, user data is written to the tape 1 by means of the write elements W of the left hand tape head module L, and is read for verification by the read elements R of the center tape head module M. The write elements W of the right hand tape head module R may not be operated when the tape is travelling the present moving direction MD. Once the moving direction MD reverses, the write elements W of the right hand tape head module R write user data to the tape 1 while the write elements W of the left hand tape head module L are in an idle mode. The read elements R of the center tape head module M may perform a read-after-write data verification, and, of course, also perform read only operations.

Figure 9:
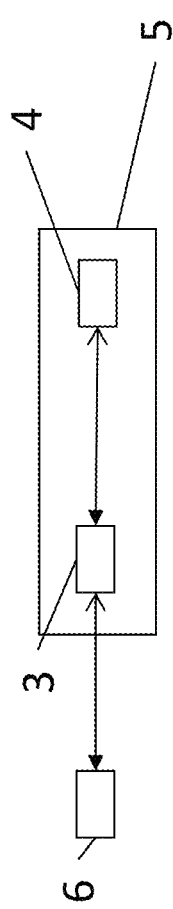
FIG. 9 is a block diagram of a tape storage system according to an embodiment of the present invention.

FIG. 9 illustrates a block diagram of a tape storage system according to an embodiment of the present invention. The tape storage system 5 comprises a controller 3 interacting with a tape drive 4 for operating the tape drive 4 in a way that data can be written and read to/from a tape inserted into the tape drive 4. The tape storage system 5 is connected to a host 6 which host 6 makes use of the tape storage system for archiving data, for example.

Figure 10:
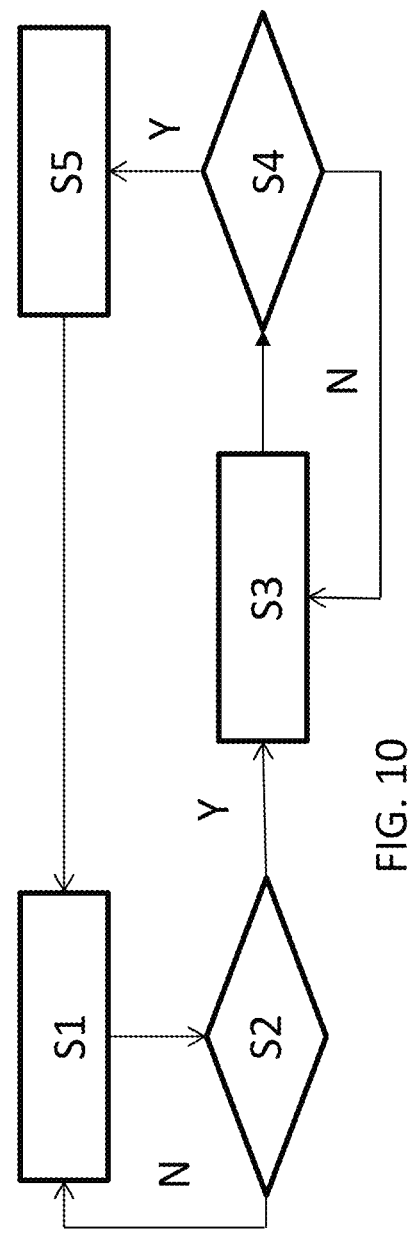
FIG. 10 is a flow chart of a method for operating a tape storage system according to an embodiment of the present invention.

FIG. 10 illustrates a flow chart of a method for operating a tape storage system according to an embodiment of the present invention. Step S1 indicates a read element of a tape head reading data from a data track assigned to the read element while the tape is moved across the tape head. In step S2 it is verified if a pre-defined longitudinal position of the tape is reached. If such pre-defined position is reached (Y), which is the indicator that a servo area written to the data band starts, a further read element starts reading multiple servo patterns from multiple data tracks simultaneously in step S3. In step S4, it is verified if another pre-defined longitudinal position of the tape has been reached, which other pre-defined position shall indicate the end of the servo pattern written to the data track. If the other pre-defined position is reached (Y), the signal supplied by the further read element during scanning the servo area is evaluated, a deviation of the lateral position of the corresponding segment from a desired position is determined, and a control signal is issued to an actuator for positioning the segment to the desired position, all in step S5. Then, the further read element again starts looking for the next predefined position indicating the start of the next burst of servo information.

As will be appreciated by one skilled in the art, aspects of the present invention may be embodied as a system, method or computer program product. Accordingly, aspects of the present invention, in particular in form of the controller, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention, such as operating, read and/or write methods, may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A tape head, comprising:
a set of segments, the set of segments including at least two columns of segments and at least two rows of segments, wherein each segment of the set is individually movable with respect to a frame;
each segment of the set comprising at least one read element configured to read data from the tape; and
each segment of the set comprising a further read element having a width transverse to a motion direction of the tape being at least a width of a write element of the segment when the segment comprises the write element or, when no write element is comprised in the segment, the further read element having the width at least a width of a write element of a different segment.

2. The tape head according to claim 1, wherein the width of the further read element of each segment of the set is at least twice the width of the write element of the segment when the segment comprises the write element or, in case that no write element is comprised in the segment, of a write element of a different segment.

3. The tape head according to claim 1, wherein:
the further read element of at least one of the segments of the set is adapted for reading servo patterns from a data band of the tape;
the further read element of the at least one of the segments of the set is offset in a direction transverse to the motion direction of the tape from at least one of the read element and the write element; and
the one or more segments of the set are movably mounted with respect to the frame of the tape head for taking different positions transverse to the motion direction of the tape.

4. The tape head according claim 1, wherein:
at least one of the write element for writing data to the tape and the read element for reading data from the tape is fixed to the frame of the tape head and wherein in a segment of the set comprising the read element, a width of the read element is at least half the width of the write element of the segment when the segment comprises the write element or, in case that no write element is comprised in the segment, of the write element of a different segment.

5. The tape head according to claim 1, wherein at least one segment of the set comprises a set of the read elements for reading data from different data tracks of the tape and a set of the write elements for writing data to different data tracks on the tape, wherein the set of the read elements and the set of the write elements are mechanically linked, and wherein the tape head comprises two columns of segments and multiple rows of segments, wherein each row of the multiple rows of segments extends along the motion direction of the tape, and each column of the two columns of segments extends transverse to the motion direction of the tape.

6. The tape head according to claim 1, wherein each segment of the set comprises a set of the read elements for reading data from different data tracks of the tape and a set of the write elements for writing data to different data tracks on the tape, and wherein each segment comprises the further read element for reading servo information from a data band of the tape.

7. The tape head according to claim 1, further comprising:
a first class of segments in which first class of segments each segment contains one or more read elements and one further read element; and
a second class of segments in which second class of segments each segment contains one or more write elements and one further read element.

8. The tape head according to claim 7, the set of segments further comprising:
three columns of segments; and
multiple rows of segments, wherein each row extends along the motion direction of the tape and each column extends transverse to the motion direction of the tape, and wherein two of the three columns contain segments of the first class only, the third column contains segments of the second class only, and the third column is arranged between the other two columns; or two of the three columns contains segments of the second class only, the third column contains segments of the first class only, and the third column is arranged between the other two columns.

9. A tape storage system, comprising:
- a tape head, including a set of segments, the set of segments including at least two columns of segments and at least two rows of segments, wherein each segment of the set is individually movable with respect to a frame, each segment of the set comprising a read element configured to read data from the tape, and each segment of the set comprising a further read element having a width transverse to a motion direction of the tape being at least a width of a write element of the segment when the segment comprises the write element or, in the event that no write element is comprised in the segment, of a write element of a different segment; and
- a controller configured to, for each segment, receive a signal read by the corresponding further read element, determine a frequency spectrum of the signal, and control an actuator for the segment so as to move the segment transverse to the motion direction of the tape subject to the determined frequency spectrum.

10. The tape storage system according claim 9, wherein the controller is configured to, for each segment, analyze the frequency spectrum and derive as a result of the analysis a transverse deviation of the segment from a desired position, and to move the segment back to the desired position by controlling the corresponding actuator.

* * * * *